United States Patent
Takamori et al.

(10) Patent No.: US 7,414,670 B2
(45) Date of Patent: Aug. 19, 2008

(54) VIDEO SIGNAL OUTPUT APPARATUS

(75) Inventors: Hiroki Takamori, Osaka (JP); Tetsuya Itani, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 705 days.

(21) Appl. No.: 11/004,181

(22) Filed: Dec. 3, 2004

(65) Prior Publication Data

US 2005/0128349 A1    Jun. 16, 2005

(30) Foreign Application Priority Data

Dec. 5, 2003    (JP) .............................. 2003-407212

(51) Int. Cl.
  *H04N 7/01*    (2006.01)
  *H04N 5/46*    (2006.01)
(52) U.S. Cl. .................... 348/441; 348/554; 348/555
(58) Field of Classification Search ................ 348/441, 348/569, 554–558, 563, 564; 345/699; *H04N 7/01, H04N 5/445, 5/50, 5/46*
  See application file for complete search history.

(56) References Cited

U.S. PATENT DOCUMENTS 6,384,870 B1 * 5/2002 Kempisty .................... 348/569
7,193,658 B2 * 3/2007 Jang ........................... 348/555

FOREIGN PATENT DOCUMENTS

CN    1325231    12/2001
JP    2001-111914    4/2001

* cited by examiner

*Primary Examiner*—Sherrie Hsia
(74) *Attorney, Agent, or Firm*—J.C. Patents

(57) ABSTRACT

A video signal output apparatus is provided. Video format information that can be displayed on a video display apparatus is detected by an I/O unit from an input data. A comparing unit compares the detected video formats with video formats that can be converted by a converting unit, and then common video formats are set as selectable video formats and output as menu video. A user sees the menu video and selects a video format. Simultaneously with the converted digital video data, video format information is also inserted into the output data and then outputted. Accordingly, the video display apparatus switches the video format of the screen. The user can select a most suitable video format from the menu screen by only connecting the apparatuses, and then the video format of the video display image apparatus is also switched automatically.

17 Claims, 16 Drawing Sheets

CEA EDID Timing Extension Version 3
(new in 861B)

| Byte# | Value | Description | Format |
|---|---|---|---|
| 0 | 02h | Tag (02h) | |
| 1 | 03h | Revision Number | |
| 2 | | Byte number offset d where Detailed Timing data begins | d=offset for the byte following the reserved data block. If no data is provided in the reserved data block, then d=4. If d=0, then no detailed timing descriptors are provided and no data is provided in the reserved data block. |
| 3 | | Total number of native (preferred) formats described by 18 byte detailed timing descriptors in entire E-EDID structure. Also, indication of underscan support, audio support, and support of YCbCr is included | bit7 (underscan)=1 if DTV Monitor supports underscan. bit6 (audio)=1 if DTV Monitor supports basic audio bit5 (YCbCr 4:4:4)=1 if DTV Monitor supports YCbCr 4:4:4 in addition to RGB bit4 (YCbCr 4:2:2)=1 if DTV Monitor supports YCbCr 4:2:2 in addition to RGB lower 4 bits=total number of native formats described using 18-byte detailed timing descriptors. |
| 4 | | Start of data block collection | This section was previously reserved for 8 byte timing descriptors (See [22].) but is currently used for CEA Data Block Collection (see Table 30). |
| d-1 | | End of data block collection | |
| d | | Start of 18-byte detailed timing descriptions | See Section 3.10.2 of [8] |
| d+(18Xn)-1 | | End of 18-byte detailed timing descriptions where n is the number of descriptors included | |
| d+(18Xn) | 00h | Beginning of Padding | |
| 126 | 00h | End of Padding | |
| 127 | | Checksum | xxh=This byte should be programmed such that a one-byte checksum (add all bytes together) of the entire 128 byte block equals "00h". |

FIG. 3

Example EDID Detailed Timing Descriptor for 720X480i (59.94Hz, 4:3)

| Byte# (HEX) | Function | Value (HEX) | Value (binary) | Notes |
|---|---|---|---|---|
| 36 | Pixel Clock/10,000 (LSB stored first) | 8C | | Pixel Clock=27.00MHz |
| 37 | | 0A | | |
| 38 | Horizontal Active Pixels (lower 8 bits) | A0 | | hor. active pixels=1440=5A0h |
| 39 | Horizontal Blanking Pixels (lower 8 bits) | 14 | | hor. blanking pixels=276=114h |
| 3A | Horizontal Active and Blanking Pixels (upper nibble=upper 4 bits of active) (lower nibble=upper 4 bits of blanking) | 51 | | |
| 3B | Vertical Active Lines, lower 8 bits | F0 | | vert. active lines=240=F0h |
| 3C | Vertical Blanking Lines, lower 8 bits | 16 | | vert. blanking lines=22=16h |
| 3D | Vertical Active:Vertical Blanking (upper nibble=upper 4 bits of active) (lower nibble=upper 4 bits of blanking) | 00 | | |
| 3E | Horizontal sync offset (pixels) (from blanking starts, lower 8 bits) | 26 | | offset=38pixels=26h |
| 3F | Horizontal sync pulse width (pixels) (lower 8 bits) | 7C | | width=124pixels=7Ch |
| 40 | Vert sync offset:Vert sync pulse width (upper nibble=lines, lower 4 bits of vertical sync offset) (lower nibble=lines, lower 4 bits of vertical sync pulse width) | 43 | | vert sync offset=4 lines vert. sync width=3 lines |
| 41 | bits 7,6:upper 2 bits of Hor. sync offset bits 5,4:upper 2 bits of Hor. sync pulse width bits 3,2:upper 2 bits of vert sync offset bits 1,0:upper 2 bits of vert. sync pulse width | 00 | 00000000 | |
| 42 | Horizontal Image Size (mm, lower 8 bits) | 13 | | Hor. image size=531mm=213h |
| 43 | Vertical Image Size (mm, lower 8 bits) | 8E | | Vert. Image Size=398mm= 18Eh (4:3 in this case). |
| 44 | Horizontal and Vertical Image Size (upper nibble=upper 4 bits of horiz.) (lower nibble=upper 4 bits of vert.) | 21 | | |
| 45 | Horizontal Border (pixels) | 0 | | Must be 0 |
| 46 | Vertical Border (pixels) | 0 | | Must be 0 |
| 47 | Flags (bit 7=non-interlaced;bit 5,6= normal display;bit 1,2,3,4=sync description;bit 0=don't care) | 98 | 10011000 | Flag=interlaced,non-stereo, digital separate,negative V sync, negative H sync |

FIG. 4

Example EDID Detailed Timing Descriptor
for 720X480p (59.94Hz, 4:3)

| Byte# (HEX) | Function | Value (HEX) | Value (binary) | Notes |
|---|---|---|---|---|
| 36 | Pixel Clock/10,000 (LSB stored first) | 8C | | Pixel Clock=27.00MHz |
| 37 | | 0A | | |
| 38 | Horizontal Active Pixels (lower 8 bits) | D0 | | hor. active pixels=720=2D0h |
| 39 | Horizontal Blanking Pixels (lower 8 bits) | 8A | | hor. blanking pixels=138=8Ah |
| 3A | Horizontal Active and Blanking Pixels (upper nibble=upper 4 bits of active) (lower nibble=upper 4 bits of blanking) | 20 | | |
| 3B | Vertical Active Lines, lower 8 bits | E0 | | vert. active lines=480=1E0h |
| 3C | Vertical Blanking Lines, lower 8 bits | 2D | | vert. blanking lines=45=2Dh |
| 3D | Vertical Active:Vertical Blanking (upper nibble=upper 4 bits of active) (lower nibble=upper 4 bits of blanking) | 10 | | |
| 3E | Horizontal sync offset (pixels) (from blanking starts, lower 8 bits) | 10 | | offset=16pixels=10h |
| 3F | Horizontal sync pulse width (pixels) (lower 8 bits) | 3E | | width=62pixels=3Eh |
| 40 | Vert sync offset:Vert sync pulse width (upper nibble=lines, lower 4 bits of vertical sync offset) (lower nibble=lines, lower 4 bits of vertical sync pulse width) | 96 | | vert. sync offset=9 lines vert. sync width=6 lines |
| 41 | bits 7,6: upper 2 bits of Hor. sync offset bits 5,4: upper 2 bits of Hor. sync pulse width bits 3,2: upper 2 bits of vert sync offset bits 1,0: upper 2 bits of vert. sync pulse width | 00 | 00000000 | |
| 42 | Horizontal Image Size (mm, lower 8 bits) | 13 | | Hor. image size=531mm=213h |
| 43 | Vertical Image Size (mm, lower 8 bits) | 8E | | Vert. Image Size=398mm= 18Eh (4:3 in this case). |
| 44 | Horizontal and Vertical Image Size (upper nibble=upper 4 bits of horiz.) (lower nibble=upper 4 bits of vert.) | 21 | | |
| 45 | Horizontal Border (pixels) | 0 | | Must be 0 |
| 46 | Vertical Border (pixels) | 0 | | Must be 0 |
| 47 | Flags (bit 7=non-interlaced; bit 5,6= normal display; bit 1,2,3,4=sync description; bit 0=don't care) | 18 | 00011000 | Flag=non-interlaced;non-stereo; digital separate;negative V sync; negative H sync |

FIG. 5

Example EDID Detailed Timing Descriptor
for 1920X1080i (60Hz, 16:9)

| Byte# (HEX) | Function | Value (HEX) | Value (binary) | Notes |
|---|---|---|---|---|
| 36 | Pixel Clock/10,000 (LSB stored first) | 01 | | Pixel Clock=74.25MHz |
| 37 | | 1D | | |
| 38 | Horizontal Active Pixels (lower 8 bits) | 80 | | hor. active pixels=1920=780h |
| 39 | Horizontal Blanking Pixels (lower 8 bits) | 18 | | hor. blanking pixels=280=118h |
| 3A | Horizontal Active and Blanking Pixels (upper nibble=upper 4 bits of active) (lower nibble=upper 4 bits of blanking) | 71 | | |
| 3B | Vertical Active Lines, lower 8 bits | 1C | | vert. active lines=540=21Ch |
| 3C | Vertical Blanking Lines, lower 8 bits | 16 | | vert. blanking lines=22=16h |
| 3D | Vertical Active:Vertical Blanking (upper nibble=upper 4 bits of active) (lower nibble=upper 4 bits of blanking) | 20 | | |
| 3E | Horizontal sync offset (pixels) (from blanking starts, lower 8 bits) | 58 | | offset=88pixels=58h |
| 3F | Horizontal sync pulse width (pixels) (lower 8 bits) | 2C | | width=44pixels=2Ch |
| 40 | Vert sync offset:Vert sync pulse width (upper nibble=lines, lower 4 bits of vertical sync offset) (lower nibble=lines, lower 4 bits of vertical sync pulse width) | 25 | | vert. sync offset=2 lines vert. sync width=5 lines |
| 41 | bits 7,6: upper 2 bits of Hor. sync offset bits 5,4: upper 2 bits of Hor. sync pulse width bits 3,2: upper 2 bits of vert sync offset bits 1,0: upper 2 bits of vert. sync pulse width | 00 | 00000000 | |
| 42 | Horizontal Image Size (mm, lower 8 bits) | C4 | | Hor. Image size=708mm=2C4h |
| 43 | Vertical Image Size (mm, lower 8 bits) | 8E | | Vert. Image Size=398mm=18Eh |
| 44 | Horizontal and Vertical Image Size (upper nibble=upper 4 bits of horiz.) (lower nibble=upper 4 bits of vert.) | 21 | | |
| 45 | Horizontal Border (pixels) | 0 | | Must be 0 |
| 46 | Vertical Border (pixels) | 0 | | Must be 0 |
| 47 | Flags (bit 7=interlaced; bit 5,6=normal display; bit 1,2,3,4=sync description; bit 0=don't care) | 9E | 10011110 | Flag=interlaced:non-stereo: digital separate:positive V sync: positive H sync |

FIG. 6

General Format of "CEA Data Block Collection"

| | Byte# | Bits 5-7 | Bits 0-4 |
|---|---|---|---|
| Video Data Block | 1 | Video Tag Code | length=total number of video bytes following this byte ($L_1$) |
| | 2 | CEA Short Video Descriptor1 | |
| | 3 | CEA Short Video Descriptor2 | |
| | ... | ... | |
| | $1+L_1$ | CEA Short Video Descriptor$L_1$ | |
| Audio Data Block | $2+L_1$ | Audio Tag Code | length=total number of audio bytes following this byte ($L_2$) |
| | $3+L_1$ | CEA Short Audio Descriptor1 | |
| | $4+L_1$ | | |
| | $5+L_1$ | | |
| | ... | | |
| | ... | | |
| | $L_1+L_2$ | CEA Short Audio Descriptor$L_2/3$ | |
| | $1+L_1+L_2$ | | |
| | $2+L_1+L_2$ | | |
| Speaker Allocation Data Block | $3+L_1+L_2$ | Speaker Allocation Tag Code | length=total number of speaker allocation bytes following this byte ($L_3=3$) |
| | $4+L_1+L_2$ | Speaker Allocation Data Block Payload (3 bytes) | |
| | $5+L_1+L_2$ | | |
| | $6+L_1+L_2$ | | |
| Vendor Specific Data Block | $7+L_1+L_2$ | Vendor Specific Tag Code | length=total number of vendor specific bytes following this byte ($L_4$) |
| | $8+L_1+L_2$ | 24-bit IEEE Registration Identifier (least significant byte first) | |
| | $9+L_1+L_2$ | | |
| | $10+L_1+L_2$ | | |
| | ... ... | Vendor Specific Data Block Payload ($L_4-3$ bytes) | |

FIG. 7

Video Identification Codes
for AVI InfoFrame Data Byte 4 and CEA
Short Descriptors

| Video Codes | Horizontal (pixels) | Vertical (pixels) | i/p | Vertical Frequency | Aspect Ratio | Where Defined | Remark |
|---|---|---|---|---|---|---|---|
| 1 | 640 | 480 | p | 59.94/60Hz | 4:3 | 861 | Default format |
| 2 | 720 | 480 | p | 59.94/60Hz | 4:3 | 861 | EDTV |
| 3 | 720 | 480 | p | 59.94/60Hz | 16:9 | 861 | EDTV |
| 4 | 1280 | 720 | p | 59.94/60Hz | 16:9 | 861 | HDTV |
| 5 | 1920 | 1080 | i | 59.94/60Hz | 16:9 | 861 | HDTV |
| 6 | 720(1440) | 480 | i | 59.94/60Hz | 4:3 | 861 Optional | Double clock for 720X480i |
| 7 | 720(1440) | 480 | i | 59.94/60Hz | 16:9 | 861 Optional | Double clock for 720X480i |
| 8 | 720(1440) | 240 | p | 59.94/60Hz | 4:3 | New | Double clock for 720X240p |
| 9 | 720(1440) | 240 | p | 59.94/60Hz | 16:9 | New | Double clock for 720X240p |
| 10 | (2880) | 480 | i | 59.94/60Hz | 4:3 | New | Game Console |
| 11 | (2880) | 480 | i | 59.94/60Hz | 16:9 | New | Game Console |
| 12 | (2880) | 240 | p | 59.94/60Hz | 4:3 | New | Game Console |
| 13 | (2880) | 240 | p | 59.94/60Hz | 16:9 | New | Game Console |
| 14 | 1440 | 480 | p | 59.94/60Hz | 4:3 | New | high-end DVD |
| 15 | 1440 | 480 | p | 59.94/60Hz | 16:9 | New | high-end DVD |
| 16 | 1920 | 1080 | p | 59.94/60Hz | 16:9 | New | Optional HDTV |
| 17 | 720 | 576 | p | 50Hz | 4:3 | 861A | EDTV |
| 18 | 720 | 576 | p | 50Hz | 16:9 | 861A | EDTV |
| 19 | 1280 | 720 | p | 50Hz | 16:9 | 861A | HDTV |
| 20 | 1920 | 1080 | i | 50Hz | 16:9 | 861A | HDTV |
| 21 | 720(1440) | 576 | i | 50Hz | 4:3 | 861A Optional | Double clock for 720X576i |
| 22 | 720(1440) | 576 | i | 50Hz | 16:9 | 861A Optional | Double clock for 720X576i |
| 23 | 720(1440) | 288 | p | 50Hz | 4:3 | New | Double clock for 720X288p |
| 24 | 720(1440) | 288 | p | 50Hz | 16:9 | New | Double clock for 720X288p |
| 25 | (2880) | 576 | i | 50Hz | 4:3 | New | Game Console |
| 26 | (2880) | 576 | i | 50Hz | 16:9 | New | Game Console |
| 27 | (2880) | 288 | p | 50Hz | 4:3 | New | Game Console |
| 28 | (2880) | 288 | p | 50Hz | 16:9 | New | Game Console |
| 29 | 1440 | 576 | p | 50Hz | 4:3 | New | high-end DVD |
| 30 | 1440 | 576 | p | 50Hz | 16:9 | New | high-end DVD |
| 31 | 1920 | 1080 | p | 50Hz | 16:9 | New | Optional HDTV |
| 32 | 1920 | 1080 | p | 23.97/24Hz | 16:9 | New | Optional HDTV |
| 33 | 1920 | 1080 | p | 25Hz | 16:9 | New | Optional HDTV |
| 34 | 1920 | 1080 | p | 29.97/30Hz | 16:9 | New | Optional HDTV |
| 35-127 | Reserved for the Future ||||||||
| 0 | No Video Code Available (Used with AVI InfoFrame only) ||||||||

FIG. 8

Auxiliary Video Information (AVI) InfoFrame format
(Version 2)

| InfoFrame Type Code | InfoFrame Type=02₁₆ | | | | | | | |
|---|---|---|---|---|---|---|---|---|
| InfoFrame Version Number | Version=02₁₆ | | | | | | | |
| Length of AVI InfoFrame | Length of AVI InfoFrame (13) | | | | | | | |
| Data Byte 1 | Rsvd=0 | Y1 | Y0 | A0 | B1 | B0 | S1 | S0 |
| Data Byte 2 | C1 | C0 | M1 | M0 | R3 | R2 | R1 | R0 |
| Data Byte 3 | Reserved (shall be 0) | | | | | | SC1 | SC0 |
| Data Byte 4 | Rsvd=0 | VIC6 | VIC5 | VIC4 | VIC3 | VIC2 | VIC1 | VIC0 |
| Data Byte 5 | Reserved (shall be 0) | | | | PR3 | PR2 | PR1 | PR0 |
| Data Byte 6 | Line Number of End of Top Bar (lower 8 bits) | | | | | | | |
| Data Byte 7 | Line Number of End of Top Bar (upper 8 bits) | | | | | | | |
| Data Byte 8 | Line Number of Start of Bottom Bar (lower 8 bits) | | | | | | | |
| Data Byte 9 | Line Number of Start of Bottom Bar (upper 8 bits) | | | | | | | |
| Data Byte 10 | Pixel Number of End of Left Bar (lower 8 bits) | | | | | | | |
| Data Byte 11 | Pixel Number of End of Left Bar (upper 8 bits) | | | | | | | |
| Data Byte 12 | Pixel Number of Start of Right Bar (lower 8 bits) | | | | | | | |
| Data Byte 13 | Pixel Number of Start of Right Bar (upper 8 bits) | | | | | | | |

FIG. 9

AVI InfoFrame Data Byte 1

| F7 | Future Use, all Zeros | | Y1 | Y0 | RGB or YCbCr | | A0 | Active Format Information Present | | B1 | B0 | Bar Info | | S1 | S0 | Scan Information |
|---|---|---|---|---|---|---|---|---|---|---|---|---|---|---|---|---|
| 0 | | | 0 | 0 | RGB (default) | | 0 | No Data | | 0 | 0 | Bar Data not valid | | 0 | 0 | No Data |
| | | | 0 | 1 | YCbCr 4:2:2 | | 1 | Active Format Information valid | | 0 | 1 | Vert. Bar Info valid | | 0 | 1 | Overscanned (television) |
| | | | 1 | 0 | YCbCr 4:4:4 | | | | | 1 | 0 | Horiz. Bar Info Valid | | 1 | 0 | Underscanned (Computer) |
| | | | 1 | 1 | Future | | | | | 1 | 1 | Vert. and Horiz. Bar Info Valid | | 1 | 1 | Future |

FIG. 10

AVI InfoFrame Data Byte 2

| C1 | C0 | Colorimetry |
|---|---|---|
| 0 | 0 | No Data |
| 0 | 1 | SMPTE 170M [1] ITU601 [5] |
| 1 | 0 | ITU709 [6] |
| 1 | 1 | Future |

| M1 | M0 | Picture Aspect Ratio |
|---|---|---|
| 0 | 0 | No Data |
| 0 | 1 | 4:3 |
| 1 | 0 | 16:9 |
| 1 | 1 | Future |

| R3 | R2 | R1 | R0 | Active Format Aspect Ratio |
|---|---|---|---|---|
| 1 | 0 | 0 | 0 | Same as picture aspect ratio |
| 1 | 0 | 0 | 1 | 4:3 (Center) |
| 1 | 0 | 1 | 0 | 16:9 (Center) |
| 1 | 0 | 1 | 1 | 14:9 (Center) |
| other values | | | | Per DVB AFD active_format field in [3] |

FIG. 11

AVI InfoFrame Data Byte 3

| F7 | F6 | F5 | F4 | F3 | F2 | Future Use, All zeros |
|---|---|---|---|---|---|---|
| 0 | 0 | 0 | 0 | 0 | 0 | |

| SC1 | SC0 | Non-uniform Picture Scaling |
|---|---|---|
| 0 | 0 | No Known non-uniform Scaling |
| 0 | 1 | Picture has been scaled horizontally |
| 1 | 0 | Picture has been scaled vertically |
| 1 | 1 | Picture has been scaled horizontally and vertically |

FIG. 12

AVI InfoFrame Data Byte 5

| PR3 | PR2 | PR1 | PR0 | Pixel Repetition for Optional (2880) |
|---|---|---|---|---|
| 0 | 0 | 0 | 0 | No Repetition (i.e., pixel sent once) |
| 0 | 0 | 0 | 1 | pixel sent 2 times (i.e., repeated once) |
| 0 | 0 | 1 | 0 | pixel sent 3 times |
| 0 | 0 | 1 | 1 | pixel sent 4 times |
| 0 | 1 | 0 | 0 | pixel sent 5 times |
| 0 | 1 | 0 | 1 | pixel sent 6 times |
| 0 | 1 | 1 | 0 | pixel sent 7 times |
| 0 | 1 | 1 | 1 | pixel sent 8 times |
| 1 | 0 | 0 | 0 | pixel sent 9 times |
| 1 | 0 | 0 | 1 | pixel sent 10 times |
| 0Ah-0Fh | | | | Reserved |

FIG. 13

UNSELECTABLE

SELECTABLE

VIDEO SIGNAL OUTPUT APPARATUS

CROSS-REFERENCE TO RELATED APPLICATION

This application claims the priority benefit of Japanese application serial no. 2003-407212, filed on Dec. 5, 2003.

BACKGROUND OF THE INVENTION

1. Field of the Invention

This invention relates in general to a video signal output apparatus capable of converting an input video format to a plurality of video formats and outputting the converted video formats.

2. Description of Related Art

In recent years, a video apparatus corresponding to a plurality of video formats is increasing due to the development of digital signal processing technology and the digitization of the video signals. Digital broadcasting is also increasingly popular and various media for recording digital video signals are also being developed. Therefore, from now on, tremendous demand for transmitting ends and receiving ends for the video signals will be increased.

The main formats used for the commercial broadcasting are 480i, 480p, 576i, 576p, 720p and 1080i, etc., for example. However, not all of the video signal output apparatus and the video display apparatus correspond to all the aforementioned formats.

Therefore, when apparatuses are connected, the combination of displayable video formats is more often restricted. Namely, a user has to know the video formats respectively corresponding to the video signal output apparatus and the video display apparatus, and the connectable video formats must be memorized. Moreover, when possessing a plurality of a video display apparatus and a video signal, there is a trouble that the video format for these apparatuses has to be reset whenever the connecting combination is changed.

For solving the above problem, Japanese Laid Open 2001-111914 (pages 3-5, and FIG. 1) provides, for example, a method which is described as follows. The video formats corresponding to the video display apparatus are automatically determined from the period of the horizontal deflection frequency. From the above determined video formats, the video signal output apparatus selects a suitable video format to output the video signals.

However, if the connected apparatus is not a CRT TV having a horizontal deviation circuit, this method is not useful. Namely, the above method cannot be applied to the recent increasingly popular liquid crystal display (LCD) TV and the plasma display panel (PDP) TV. In addition, when the user himself selects a video format, the connected apparatuses have to be reset respectively.

Conventionally, when video images are seen by connecting a video display apparatus and a video signal output apparatus corresponding to a plurality of video formats, the connectable image format has to be memorized. When the connected apparatuses are changed, there is a problem that the video format of these apparatuses needs to be reset.

SUMMARY OF THE INVENTION

According to the foregoing description, an object of this invention is to provide a video signal output apparatus, which can be effectively applied to a connected video display apparatus using various display devices such that displayable video format can be automatically determined and displayed on a menu screen for a user to simply select and switch the video format.

In accordance with the objects mentioned above, the present invention provides a video signal output apparatus, comprising a comparing unit, a selecting unit and a converting unit. The comparing unit is used for comparing video format information with displayable video format information capable of being displayed on a video display apparatus, and then outputting common video format information. The selecting unit is used for selecting an output video format from the common video format information. The converting unit is used for converting a video data according to the selected output video format. In addition, the selecting unit outputs a menu data for selecting the output video format according to an output of the comparing unit.

According to video signal output apparatus of the present invention, when seeing video image by connecting the video display apparatus and the video signal output apparatus corresponding to a plurality of video formats, particularly when the connected apparatus is changed, the connected video format can be automatically determined and displayed on the menu screen, so that a user can select and switch the video format in order to effectively display the image. Therefore, regardless whether or not the user has a detailed knowledge about apparatuses, the displayable video format can be easily selected. As the user sets the video format to be outputted to the video signal output apparatus, the video format of the video display apparatus is also automatically switched. Furthermore, the video signal output apparatus is also effective for a case that a video display apparatus using various display devices is connected.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

FIG. 3 is a diagram showing a data format of EDID data.

FIG. 4 shows an example of a detailed timing descriptor for 480i.

FIG. 5 shows an example of a detailed timing descriptor for 480p.

FIG. 6 shows an example of a detailed timing descriptor for 1080i.

FIG. 7 is a diagram showing a data format of a data block collection.

FIG. 8 is a diagram showing a data format of a short video descriptor.

FIG. 9 is a diagram showing a data format of a Auxiliary Video Information (AVI) Info Frame data.

FIG. 10 is a diagram showing detail setting values of data byte 1 of the AVI Info Frame data.

FIG. 11 is a diagram showing detail setting values of data byte 2 of the AVI Info Frame data.

FIG. 12 is a diagram showing detail setting values of data byte 3 of the AVI Info Frame data.

FIG. 13 is a diagram showing detail setting values of data byte 5 of the AVI Info Frame data.

DESCRIPTION OF THE PREFERRED EMBODIMENT

The embodiments of the present invention are described in detail as follows with reference to attached drawings.

First Embodiment

Figure 1:
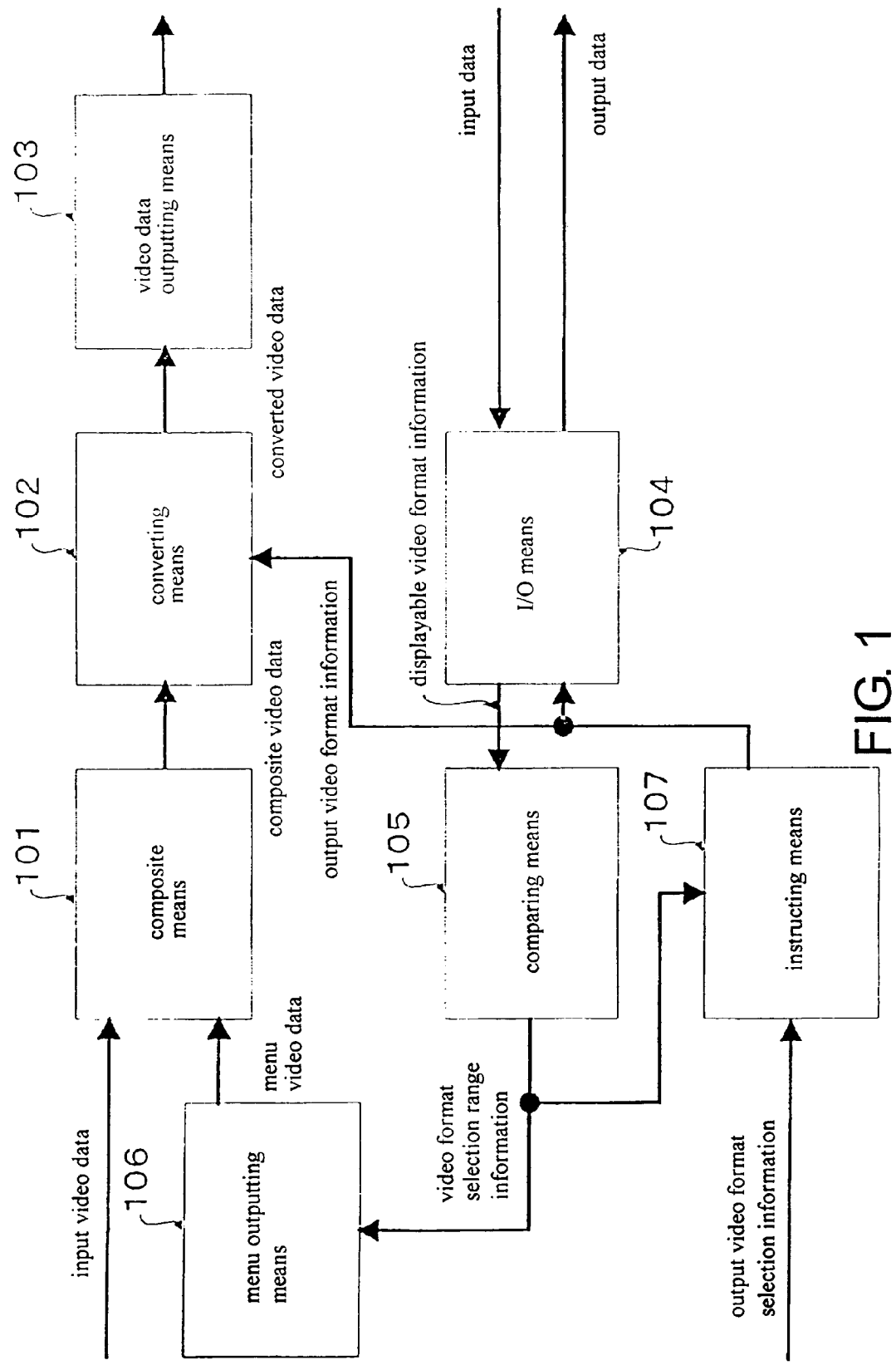
FIG. 1 is a diagram showing a video signal output apparatus according to the first embodiment of the present invention.

FIG. 1 shows a video signal output apparatus according to the first embodiment of the present invention. In FIG. 1, the video signal output apparatus comprises a composite unit 101, a converting unit 102, a video data outputting unit 103, an input and output (I/O) unit 104, a comparing unit 105, a menu outputting unit 106 and an instructing unit 107. The composite unit 101 is used to compose or switch an input video data and a menu video data, and then output a composed video data. The converting unit 102 is used to convert the composed video data into a different video format according to video format information of the video data outputted from the video signal output apparatus, and then output a converted video data. The video data outputting unit 103 is used to convert the converted video data into a digital video data format that can be transmitted to a video display apparatus, and then output the digital video data format. The I/O unit 104 detects video format information that the video display apparatus can display from the input data, and then inserts output video format information into the output data. The comparing unit 105 is used to compare the displayable video format information with the convertible video format information that can be converted by the converting unit 102, and then output video format selection range information, wherein common video formats to both of the displayable video format information and the convertible video format information are determined as selectable video formats. The menu outputting unit 106 is used to output menu video data according to an output of the comparing unit 105, wherein the menu video data is displayed on the video display apparatus for selecting a video format. The instructing unit 107 is used for outputting output video format information according to the output video format selection information, wherein the output video format selection information is inputted by selecting from the menu video data.

The operation of the above structure is described in detail as follows. For a comprehensive description, the video format of the input video data is assumed to be 480i. The video formats that can be converted by the converting unit 102 are assumed to be 480p, 720p and 1080i. The video formats corresponding to a connected video display apparatus are assumed to be 480i, 480p and 1080i.

The video signal output apparatus corresponds to a standard of High-Definition Multimedia Interface (HDMI). The HDMI standard was drawn up on December, 2002 by seven companies, Matsushita, Hitachi, Toshiba, Philips, Thomson and Silicon Image. The format of the digital video data inputted and outputted between the video signal output apparatus and the video display apparatus is based on an EIA/CEA-861B standard. In the HDMI standard, an input and output of attribute information other than the digital data is handled.

One example of the attribute information is information related to video data that the video display apparatus can display on the screen or input, and information related to audio data that can be inputted to the video display apparatus. This information is based on a standard of Extended Display Identification Data (EDID) drawn by VESA, and stored in a data format specified by the EIA/CEA-861B standard. FIG. 3 shows an example of a data format of an EDID data. Information related to the video format can be recorded in a detailed timing descriptor of the EDID data. The information related to the video format can be a clock frequency, an effective horizontal pixel number, a horizontal blanking pixel number, an effective vertical line number, a vertical blanking line number, a horizontal synchronous offset, a horizontal synchronous pulse width, a vertical synchronous offset, a vertical synchronous pulse width and an aspect, etc. Each information can be represented by 8 bits, and can be set to any value.

FIG. 4 shows an example of a detailed timing descriptor for 480i. FIG. 5 shows an example of a detailed timing descriptor for 480p. FIG. 6 shows an example of a detailed timing descriptor for 1080i.

In EDID data, there is a short video descriptor used as information related to the video format. From the Byte 4 of the EDID data in FIG. 3, a data block collection is recorded, but the short video descriptor is recorded in the video data of the data block collection. FIG. 7 shows a data format of the data block collection. FIG. 8 shows a data format of the short video descriptor. A plurality of video formats generally used for the commercial broadcasting is enumerated in the short video descriptor. In each video format, a video code consisting of 7 bits is assigned. By recording the video code of the short video descriptor, a displayable video format on the screen can be set. For each video format, information of a horizontal pixel number, a vertical line number, a distinction between interlace and progressive, a frame frequency and an aspect is prescribed.

A plurality of video formats, which the video display apparatus can display on the screen or can be inputted, is recorded in the detailed timing descriptor and the short video descriptor. In the first embodiment of the present invention, these exemplary formats are 480i, 480p and 1080i. The video signal output apparatus reads the EDID data at a certain timing from the video display apparatus.

Another exemplary attribute information is video and audio related information that the video signal output apparatus executes its output. This information is stored in an Info Frame format, which is prescribed by the EIA/CEA-861B standard. FIG. 9 shows a data format of Auxiliary Video Information (AVI) Info Frame data, which is video related. Video codes of a short video descriptor are also recorded in the data byte 4 of the AVI Info Frame data. For explaining other data bytes, detailed setting values in the data byte 1 is shown in FIG. 10, FIG. 11 shows detailed setting values in the data byte 2, FIG. 12 shows detailed setting values in the data byte 3 and FIG. 13 shows detailed setting values in the data byte 5.

Information showing a distinction between a YCbCr format and an RGB format is recorded in the data byte 1. Information of such colorimetry and aspect is recorded in the data byte 2. Therefore, information related to the video format of the AVI Info Frame data can be a horizontal pixel number, a vertical line number, a distinction between interlace and progressive, a frame frequency, an aspect, a distinction between the YCbCr format and the RGB format, a colorimetry, etc.

In the video signal output apparatus, information related to the video for outputting is recorded in the AVI Info Frame data. The video signal output apparatus outputs the AVI Info Frame data to the video display apparatus at a certain timing.

When a user connects the video output apparatus and the video display apparatus by an HDMI standard cable, the video output apparatus reads the EDID data from the video display apparatus. Then, the I/O unit 104 detects the detailed timing descriptor data and the short video descriptor data as displayable video format information from the input data, i.e., the EDID data.

Figure 14:
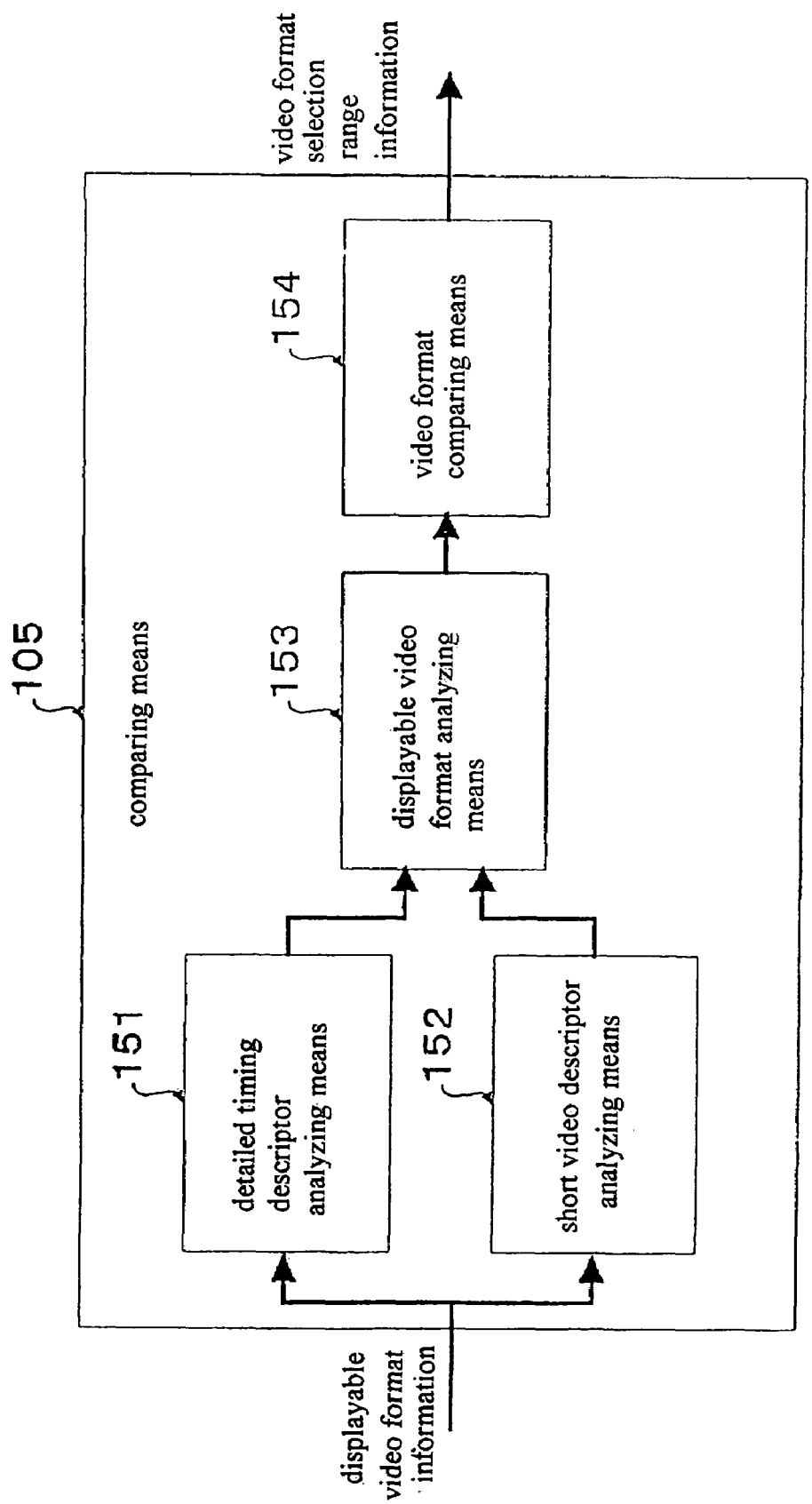
FIG. 14 shows a structure of a comparing unit according to the first embodiment of the present invention.
Figure 15A:
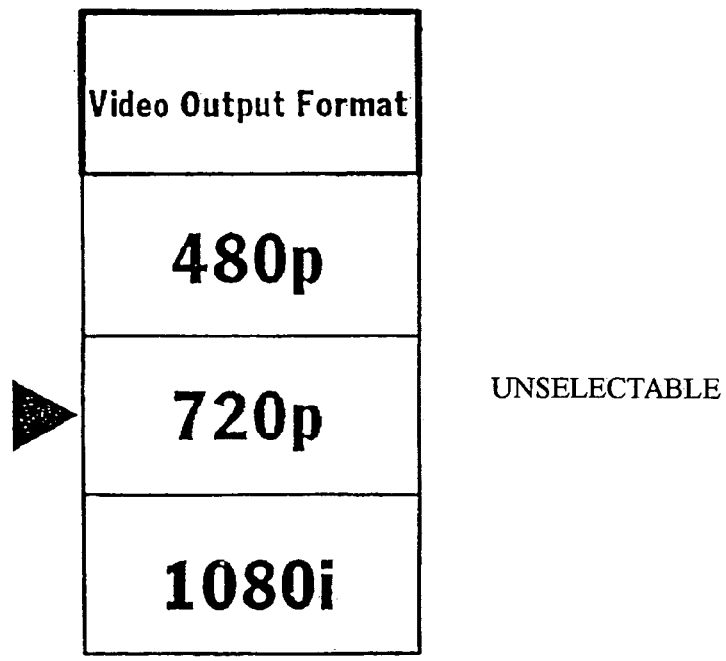
FIGS. 15A and 15B schematically show the first example of a menu screen according to the present invention.
Figure 15B:
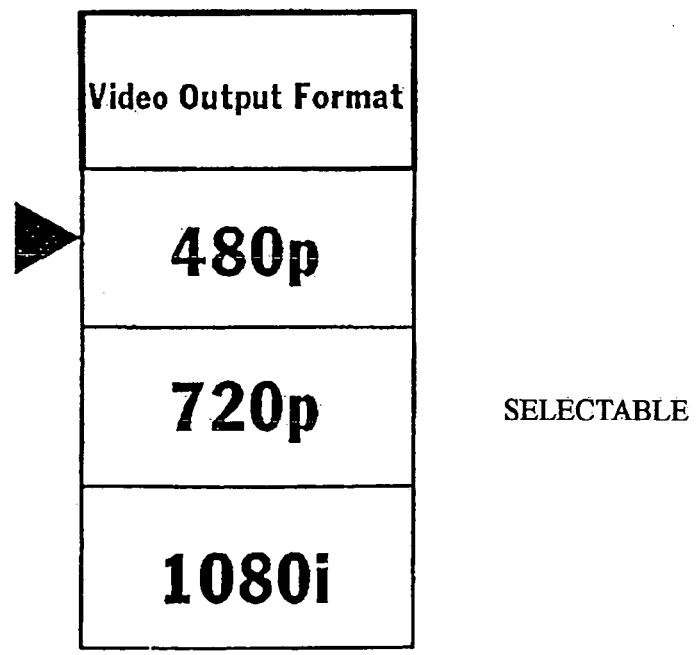

FIG. 14 shows an exemplary structure of the comparing unit 105. The comparing unit 105 comprises a detailed timing descriptor analyzing unit 151, a short video descriptor analyzing unit 152, a displayable video format analyzing unit 153 and a video format comparing unit 154. The detailed timing descriptor analyzing unit 151 analyzes the detailed timing descriptor data to obtain a video format. The short video descriptor analyzing unit 152 analyzes the short video descriptor data to obtain a video format. A displayable video format is thus obtained by the displayable video format analyzing unit 153 according to the video formats obtained by the two analyzing unit 151, 152.

There is a Digital Visual Interface (DVI) standard which is a digital video data format similar to the HDMI standard. Therefore, if a format corresponds to the HDMI standard, the format can also correspond to the DVI standard. However, only the detailed timing descriptor exists in the EDID data of the DVI standard. Therefore, when only the detailed timing descriptor exists, the displayable video format analyzing unit 153 sets a video format outputted from the detailed timing descriptor 151 as the displayable video format. In addition, the video formats obtained from the detailed timing descriptor analyzing unit 151 and the short video descriptor analyzing unit 152 might be inconsistent due to a mistake of the EDID data. In this case, as the short video descriptor is represented as video code 7 bit and the number of represented items is small, the possibility of error is considered to be low. Therefore, the video format obtained from the short video descriptor analyzing unit 152 is prioritized. The 480i, 480p and 1080i formats are obtained as the displayable video formats by the displayable video format analyzing unit 153.

The displayable video formats obtained by the displayable video format analyzing unit 153 and the video formats that can be converted by the converting unit 102 are compared by the video format comparing unit 154. In the first embodiment, according to a comparison result between displayable video formats 480i, 480p and 1080i and the convertible video formats 480p, 720p and 1080i, information indicating that 480p and 1080i are selectable video formats is outputted to the menu outputting unit 106 and the instructing unit 107.

When the user calls the selection menu for selecting the video format, the menu outputting unit 106 outputs the menu video data to the composite unit 101 for selecting 480p or 1080i.

FIGS. 15-19 show examples of a menu screen. FIGS. 15A and 15B are diagrams showing the first example of the menu screen of the present invention. In FIG. 15A, when the cursor indicating the selection item is located at the position of the unselectable 720p format, text for indicating "unselectable" is presented. In FIG. 15B, when the cursor indicating the selection item is located at the position of the selectable 480p format, text for indicating "selectable" is presented. According to the menu display method of this example, there can be three different ways: presenting the text only for the unselectable video formats, presenting the text only for the selectable video formats and presenting texts for both of the unselectable and the selectable video formats.

Figure 16A:
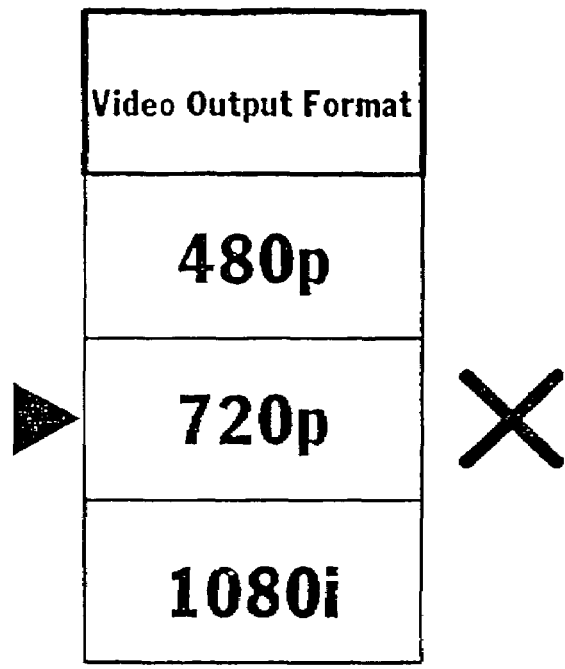
FIGS. 16A and 16B schematically show the second example of a menu screen according to the present invention.
Figure 16B:
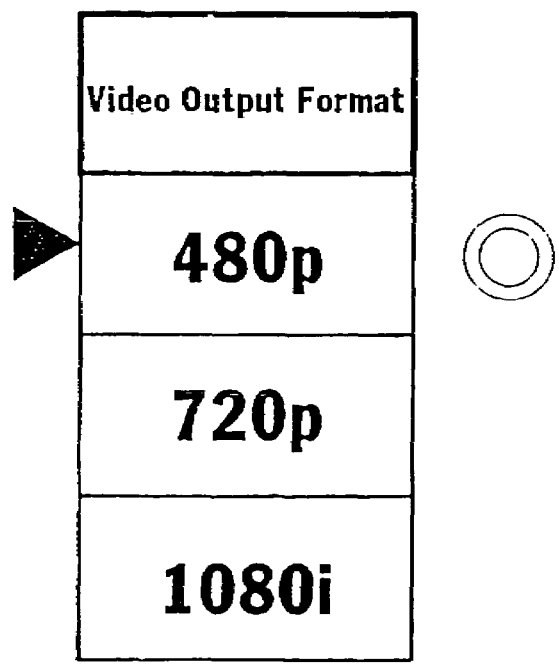

FIGS. 16A and 16B are diagrams showing the second example of the menu screen of the present invention. In FIG. 16A, when the cursor indicating the selection item is located at the position of the unselectable 720p format, an icon for indicating "unselectable" is presented. In FIG. 16B, when the cursor indicating the selection item is located at the position of the selectable 480p format, an icon for indicating "selectable" is presented. According to the menu display method of this example, there can be three different ways: presenting the icon only for the unselectable video formats, presenting the icon only for the selectable video formats and presenting icons for both of the unselectable and the selectable video formats.

Figure 17A:
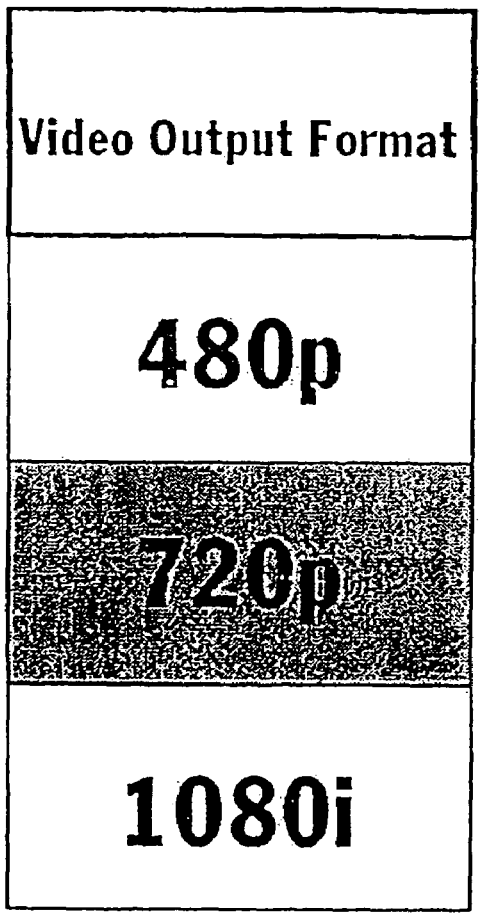
FIGS. 17A and 17B schematically show the third example of a menu screen according to the present invention.
Figure 17B:
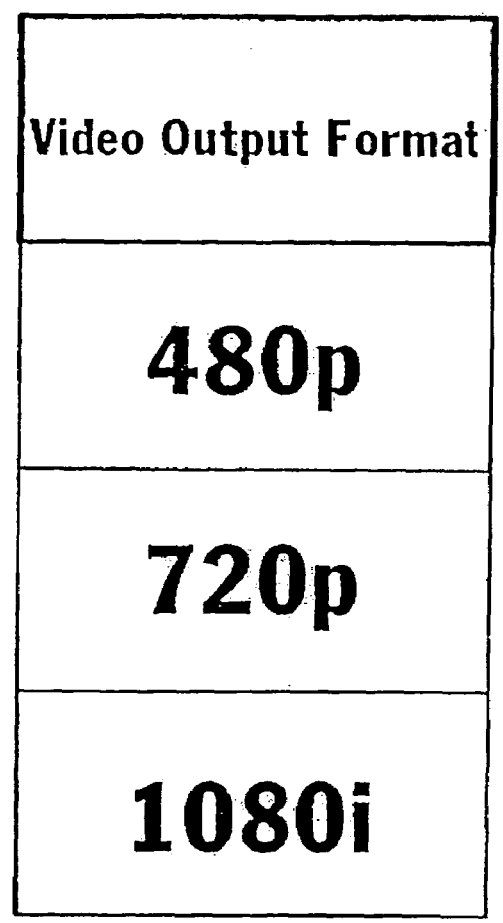

FIGS. 17A and 17B show the third example of the menu screen of the present invention. In FIG. 17A, the brightness of the unselectable 720p format is reduced for distinction, the cursor indicating selection items will not stop at the position of the 720p format and thus the 720p format cannot be selected. In contrast, FIG. 17B shows a menu screen when anyone of the 480p, 720p and 1080i formats can be selected.

Figure 18A:
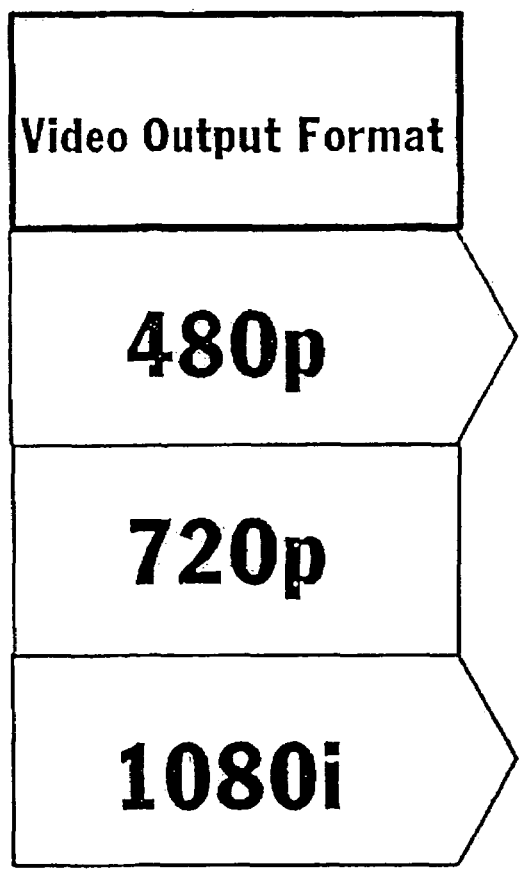
FIGS. 18A and 18B schematically show the fourth example of a menu screen according to the present invention.
Figure 18B:
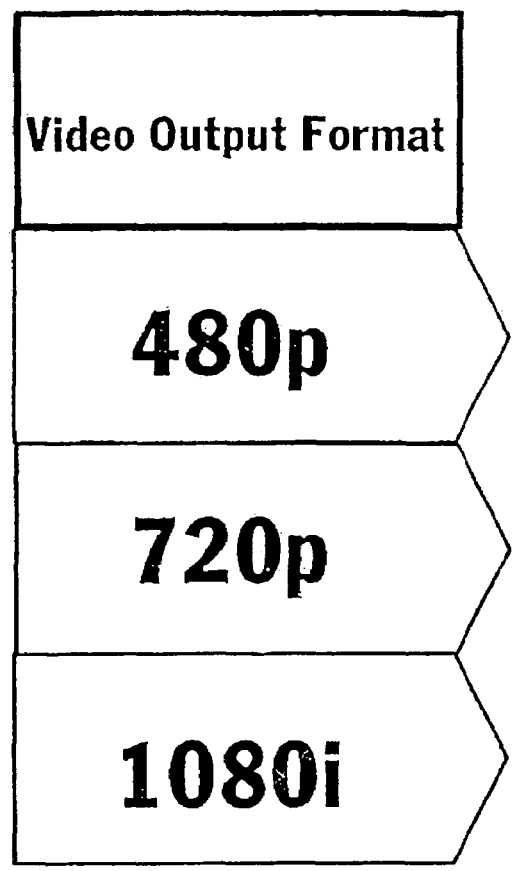

FIGS. 18A and 18B show the fourth example of the menu screen of the present invention. In FIG. 18A, the frame shape of the unselectable 720p format is changed, the cursor indicating selection items will not stop at the position of the 720p format and thus the 720p format cannot be selected. In contrast, FIG. 18B shows a menu screen when anyone of the 480p, 720p and 1080i formats can be selected.

Figure 19A:
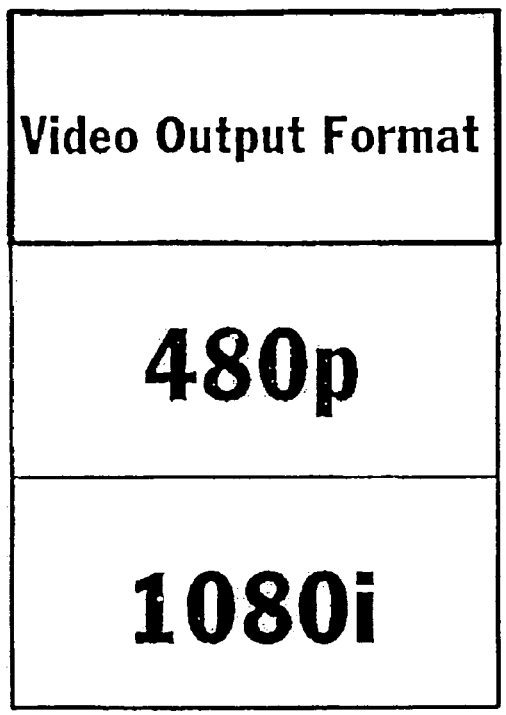
FIGS. 19A and 19B schematically show the fifth example of a menu screen according to the present invention.
Figure 19B:
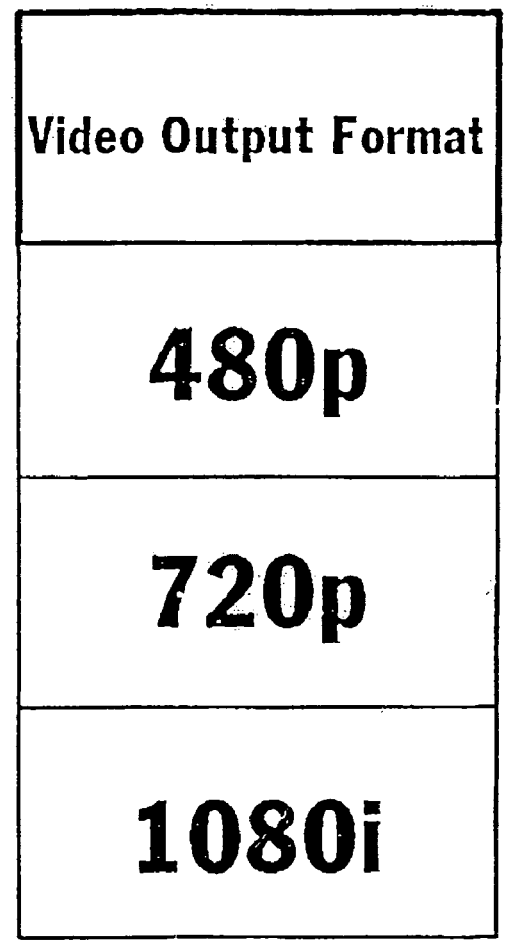

FIGS. 19A and 19B show the fifth example of the menu screen of the present invention. In FIG. 19A, the unselectable 720p format is not shown in the menu screen, and thus cannot be selected. In contrast, FIG. 19B shows a menu screen when anyone of the 480p, 720p and 1080i formats can be selected.

Seeing the menu screen as shown in FIGS. 15, 16, 17, 18 or 19, the user selects any one of the video formats 480p, 1080i. The selected video format is used as output video format selection information, and then inputted to the output video format instructing unit 107. After the selected video format is confirmed to be within the selectable video formats, the output video format instructing unit 107 instructs the converting unit 102 to convert the video format into the selected video format.

The video format of the input video data is 480i and the format of the menu video data inputted to the composite unit 101 is also 480i. The input video data and the menu video data are composed by the composite unit 101. The converting unit 102 converts the video format of the composite video data according to an instruction from the output video format instructing unit 107. The converted video data is converted into a data format based on the ELA/CEA-861B standard by the video data outputting unit 103, and then outputted from the video signal output apparatus. The I/O unit 104 inserts the output video format information into the Info Frame data, and then outputs the Info Frame data as an output data. The video display apparatus switches the video format of the screen according to the output video format information that is inputted from the video signal output apparatus, and then displays the video data on the screen.

In this way, the connected video format can be automatically determined and displayed on the menu screen. As the user selects and switches the video format from the menu screen, the video format of the video display apparatus is automatically switched. In addition, the present invention is also effective for a case that a video display apparatus using various display devices is connected without limitations of the display methods of the display devices.

The menu screen displayed by the video signal output apparatus is not limited to FIGS. 15-19. Upon displaying all the video formats that can be converted by the converting unit, it is enough to distinctively display video formats that can be and cannot be displayed on the video display apparatus. This distinction can use text, icon or symbol to present a selectable video format or an unselectable video format. In addition, the menu screen can be displayed by using a change in color or brightness, or by a change in shape. When a video format is distinguished as undisplayable, a cursor indicating selection items does not stop at a position corresponding to the undisplayable video format, and the undisplayable video format cannot be selected. Alternatively, the menu screen can only display video formats that can be converted by the converting unit and displayed by the video display apparatus.

The video format of the input video data is not limited to 480i. The video formats that can be converted by the converting unit 102 are not limited to 480p, 720p and 1080i. The video formats corresponding to the connected video display apparatus are not limited to 480i, 480p and 1080i. These video formats can be set to various video formats.

In addition, the digital video data format, the input data and the output data capable of being transmitted to the video display apparatus are not limited to the HDMI standard.

Second Embodiment

Figure 2:
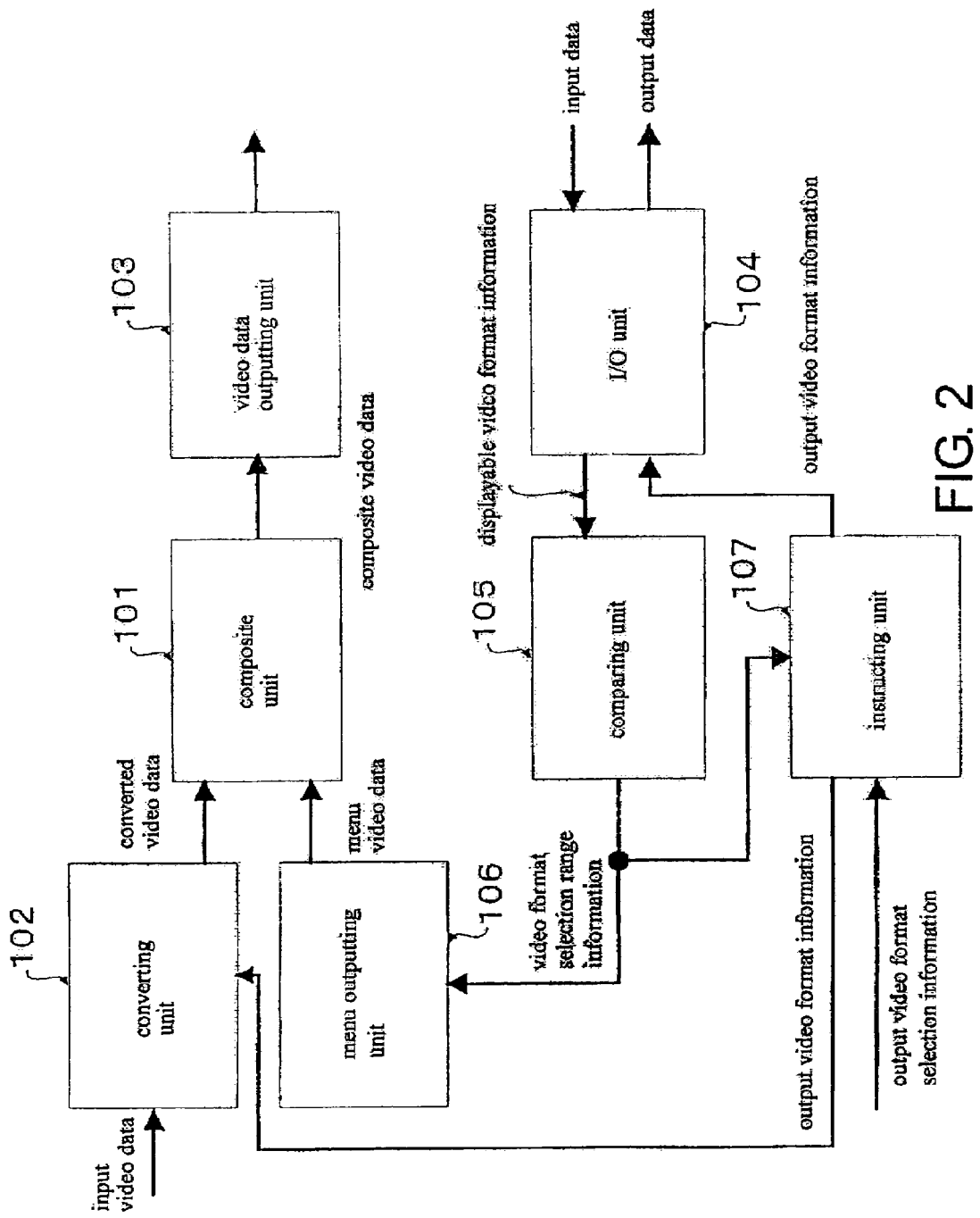
FIG. 2 is a diagram showing a video signal output apparatus according to the second embodiment of the present invention.

FIG. 2 shows a video signal output apparatus according to the second embodiment of the present invention. In FIG. 2, the video signal output apparatus comprises a composite unit 101, a converting unit 102, a video data outputting unit 103, an input and output (I/O) unit 104, a comparing unit 105, a menu outputting unit 106, an instructing unit 107. The converting unit 102 is used to convert the input data into a different video format according to video format information of the video data outputted from the video signal output apparatus, and then output a converted video data. The composite unit 101 is used to compose or switch the converted video data and menu video data, and then output a composed video data. The video data outputting unit 103 is used to convert the composed video data into a digital video data format that can be transmitted to a video display apparatus, and then output the digital video data form. The I/O unit 104 detects video format information that can be displayed on the video apparatus from the input data, and inserts the output video format information to the output data. The comparing unit 105 compares the displayable video format information detected by the I/O unit 104 with the video format information that can be converted by the converting unit 102, and then outputs video format selection range information where common video formats to both of the displayable video format information and the convertible video format are set as selectable video formats. According to the output of the comparing unit 105, the menu output unit 106 outputs a menu video data to be displayed on the video display apparatus for selecting a video format. The instructing unit 107 is used for outputting output video format information according to the output video format selection information, wherein the output video format selection information is inputted by selecting from the menu video data.

The operation of the above structure of the second embodiment is described in detail as follows. In FIG. 2, since elements with the same reference numbers as FIG. 1 have the same function, their detail descriptions are omitted and only the differences are described. In the second embodiment, the menu outputting unit 106 can output a menu video data with the same format that can be converted by the converting unit 102. Therefore, the converted video data of a video format selected by the user and the menu video data are composed by the composite unit 101.

In this way, the connectable video format can be automatically determined and displayed on the menu screen. As a user selects and switches the video format from the menu screen, the video format of the video display apparatus is automatically switched. In addition, the present invention is also effective for a case that a video display apparatus using various display devices is connected without limitations of the display methods of the display devices.

According to an embodiment of the present invention, when watching video images through connecting the video display apparatus and the video signal output apparatus corresponding to a plurality of video formats, the video format formation that is inputted from the video display apparatus and that can be displayed on the video display apparatus is compared with the video format information that can be converted by the video signal output apparatus, and then the common video formats are displayed as the selectable video formats on the menu screen. In this manner, even though the user does not have a detailed knowledge about apparatuses, the video images can be seen with a desired video format by only selecting and switching the video format from the menu screen after the apparatuses are connected. Furthermore, the present invention can also be applied to applications where the video formats of the video display apparatus have to be automatically switched.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A video signal output apparatus, comprising:
   a comparing unit for comparing video format information with displayable video format information capable of being displayed on a video display apparatus, and outputting common video format information;
   a selecting unit for selecting an output video format from the common video format information; and
   a converting unit for converting a video data according to the selected output video format,
   wherein video formats that can be and cannot be displayed on the video display apparatus are distinctively presented.

2. The video signal output apparatus of claim 1, wherein the selecting unit outputs a menu data for selecting the output video format according to an output of the comparing unit.

3. The video signal output apparatus of claim 2, wherein all the video formats that can be converted by the converting unit are adapted to be displayed.

4. The video signal output apparatus of claim 2, wherein the selecting unit outputs data only showing formats that can be converted by the converting unit and displayable on the video display apparatus.

5. The video signal output apparatus of claim 2, wherein data inputted and outputted between the video display apparatus and an I/O unit is based on a High-Definition Multimedia Interface (HDMI) standard.

6. The video signal output apparatus of claim 1, wherein a distinction for the video formats is a presentation showing a displayable video format on a menu screen when the video format is displayable, and/or is a presentation showing an undisplayable video format on the menu screen when the video format is not displayable.

7. The video signal output apparatus of claim 6, wherein the presentation uses a text.

8. The video signal output apparatus of claim 6, wherein the presentation uses an icon or a symbol.

9. The video signal output apparatus of claim 6, wherein a distinction for the video formats is presented by a change in color or brightness on the displayed menu screen.

10. The video signal output apparatus of claim 6, wherein a distinction for the video formats is presented by a change in shape on the displayed menu screen.

11. The video signal output apparatus of claim 6, wherein when the video format is distinguished as undisplayable on the menu screen, a cursor indicating selection items does not stop at a position corresponding to the undisplayable video format, and the undisplayable video format cannot be selected.

12. The video signal output apparatus of claim 1, wherein data inputted and outputted between the video display apparatus and an I/O unit comprises at least one information of a clock frequency, an effective horizontal pixel number, a horizontal blanking pixel number, an effective vertical line number, a vertical blanking line number, a horizontal synchronous offset, a horizontal synchronous pulse width, a vertical synchronous offset, a vertical synchronous pulse width, an aspect, a horizontal pixel number, a vertical line number, a distinction between interlace and progressive, a frame frequency, a distinction between a YCbCr format and a RGB format, and colorimetry.

13. A video signal output apparatus, comprising:
   a composite unit for composing an input video data and a menu video data, and outputting a composed video data;
   a converting unit for converting the composed video data into a different video data format according to video format information, and outputting a converted video data;
   a comparing unit for comparing convertible video format information capable of being converted by the converting unit with displayable video format information capable of being displayed on a video display apparatus, and outputting common video format information; and
   a selecting unit for selecting an output video format from the common video format information.

14. The video signal output apparatus of claim 13 further comprising:
   a video data outputting unit, for converting the converted video data into a digital video data format that can be transmitted to a video display apparatus, and then outputting the digital video data format.

15. The video signal output apparatus of claim 13 further comprising:
   an I/O unit for detecting video format information that the video display apparatus can display from the input data, and inserting output video format information into the output data.

16. The video signal output apparatus of claim 13 further comprising:
   a menu outputting unit, for outputting a menu video data according to an output of the comparing unit, wherein the menu video data is displayed on the video display apparatus for selecting a video format.

17. The video signal output apparatus of claim 13 further comprising:
   an instructing unit, for outputting output video format information according to output video format selection information, wherein the output video format selection information is inputted by selecting from the menu video data.

* * * * *